United States Patent [19]

Bement et al.

[11] Patent Number: 5,050,789

[45] Date of Patent: Sep. 24, 1991

[54] APPARATUS AND METHOD FOR EXPLOSIVE BONDING TO EDGE OF FLYER PLATE

[75] Inventors: Laurence J. Bement, Newport News; Anne C. Kushnick, Williamsburg, both of Va.

[73] Assignee: The United States of America as represented by the United States National Aeronautics and Space Administration, Washington, D.C.

[21] Appl. No.: 591,644

[22] Filed: Oct. 2, 1990

[51] Int. Cl.$^5$ .............................................. B23K 20/08
[52] U.S. Cl. ....................................... 228/107; 228/2.5
[58] Field of Search ............... 228/107, 108, 109, 2.5; 29/421.2; 72/706

[56] References Cited

U.S. PATENT DOCUMENTS

| | | | |
|---|---|---|---|
| 3,998,374 | 12/1976 | Cranston et al. | 228/107 |
| 4,708,280 | 11/1987 | Bement et al. | 228/2.5 |
| 4,842,182 | 6/1989 | Szecket | 228/109 |

FOREIGN PATENT DOCUMENTS 0003078  7/1979  European Pat. Off. ............ 228/109

Primary Examiner—Samuel M. Heinrich
Attorney, Agent, or Firm—George F. Helfrich

[57] ABSTRACT

The invention is an apparatus and a process for the explosive joining of a flyer plate and a base plate. The apparatus consists of a flyer plate positioned over a base plate. The flyer plate has a notch containing a filler material in intimate contact with the flyer plate. An adhesive means holds a ribbon explosive partially overlapping the notch in the flyer plate. A detonating means initiates the ribbon explosive that drives the flyer plate to accomplish a high velocity, angular collision between the mating surfaces. This collision creates surface melts and effacing bonding, resulting in electron-sharing linkups between the plates. An unbonded tab of the flyer plate is lifted and levered to apply a peeling stress to the limit of the bond. The unbonded tab fractures at a base of the notch leaving a bond to an edge of the attached flyer plate.

40 Claims, 4 Drawing Sheets

APPARATUS AND METHOD FOR EXPLOSIVE BONDING TO EDGE OF FLYER PLATE

ORIGIN OF THE INVENTION

The invention described herein was made in the performance of work under a NASA contract and is subject to the provisions of Section 305 of the National Aeronautics and Space Act of 1958, as amended, Public Law 85-568 (72 Stat. 435; 42 USC 2457).

BACKGROUND OF THE INVENTION

1. Field of the Invention

This invention relates to metal bonding using explosive energy. More specifically, the invention is an apparatus and method for explosive bonding between a flyer plate and a base plate to achieve a bond to the edge of the flyer plate.

2. Description of the Related Art

Demand is increasing for highly reliable, remote, metal joining of plates at low initial investment for inaccessible operations such as assembly of structures in space and fabrication of hermetic seals in small areas. Prior art methods, such as mechanical fasteners, swaging fusion welding, soldering, and adhesives have been inadequate due to constraints to hand operations, inaccessibility of the parts to be joined, insufficient strength and resistance to environments, particularly high temperatures. Only explosive joining offers the characteristics to meet the above requirements. This type of joining produces metallurgical bonds that the other processes cannot achieve. The explosive joining process creates a high velocity, angular collision between the metal surfaces, which causes formation of interatomic, electron-sharing linkups.

Previous methods of explosive joining, however, have limited suitability because they require using relatively large amounts of explosive, which results in an inability to locate precisely the limits of the bonded area. Repeated joining cycles of the previous art, all using the exact same setup, result in varied bond areas and require sophisticated test methods, such as ultrasonic nondestructive testing, to determine the limits of the bond. Thus, to assure the bond area extends to a prescribed limit, conventional joining processes must overlap the bond beyond the prescribed limit and then remove the overlap.

For example, the prior art disclosed in U.S. Pat. No. 3,940,049, by Richter et al, anticipates removal of the unbonded flyer plate and suggests various methods for leaving a region of the flyer plate unbonded. These methods include leaving the intended unjoined zones free of explosive, using a separating agent such as grease to prevent the bonding, or oxidizing the intended unjoined zones by electrolysis prior to the explosive bonding. Richter also proposes upwardly bending the flyer plate after bonding to allow for machining of the base plate, but never hints at fracturing the flyer plate to provide a bond to its edge. Removal of the outer extremity of the unbonded flyer plate through machining or grinding is difficult, particularly at the joining site, and may damage the surface of the base plate.

Previous methods of explosive joining have limited suitability also because the large amounts of explosive present problems in safe handling and operation. Impacts, electrical shocks, heat, and fire may ignite the explosive and subsequently increase the hazards of operation. Large amounts of explosive may also result in damage to lightweight structures such as thin plates.

SUMMARY OF THE INVENTION

The present invention is an apparatus and process for miniature explosive joining of two metallic surfaces.

An object of the present invention is to provide a means of explosive joining to an edge of a flyer plate without machining or grinding.

Another object of the present invention is to provide a means of explosive joining with repeatable and precise locations of the joint.

Yet another object of the present invention is to provide a means of explosive joining which minimizes the amount of explosive required.

A further object of the present invention is to provide a means of explosive joining which reduces damaging pressure waves, noise nuisance, and damage to surrounding structures.

The present invention attains the foregoing and additional objects by providing an apparatus and process for explosive joining of a flyer plate to a base plate. The apparatus consists of a flyer plate bent to an optimum collision angle or, alternatively, positioned above a base plate and separated by a standoff means such as tape. The flyer plate contains a notch filled with material in intimate contact with the flyer plate, the material having at least a density and advantageously additional physical properties similar to those of the flyer plate. An adhesive means such as double back tape holds a ribbon explosive centered over the flyer plate. Preferably, a second adhesive means holds the filler material in intimate contact within the notch. The process involves initiating the ribbon explosive by a detonating means to drive the flyer plate onto the base plate and accomplish an explosive joint. An unbonded tab of the flyer plate is lifted and levered to apply a peeling stress to the limit of the bonded area. The tab fractures at a base of the notch, leaving a bond to an edge of the flyer plate.

DESCRIPTION OF THE PREFERRED EMBODIMENT

Figure 1:
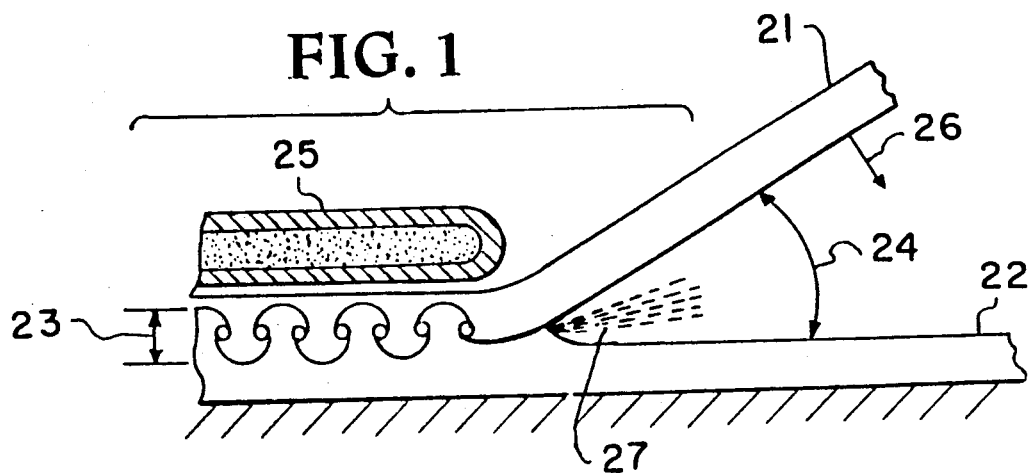
FIG. 1 is a cross-sectional view of an explosive joining of two metal plates, exaggerating the joint depths and impact angles for illustrative purposes.

The present invention involves the physical process depicted in FIG. 1, exaggerating for illustrative purposes the operation of an explosive joint 10 with a surface interaction depth 23 and an optimum high velocity collision angle 24 between a flyer plate 21 and a base plate 22. Explosive charge 25 is a ribbon explosive, such as a high energy low-quantity sheathed miniature explosive, a lead-sheathed cyclotrimethylene-trinitramine (RDX) explosive, or any secondary explosive, that generates several million pounds of pressure per square inch on top of the flyer plate 21. This pressure creates velocities 26 in the flyer plate 21 of several thousand feet per second. Upon impact with the base plate 22, the kinetic energy of the flyer plate converts into skin-deep (approximately 0.001 inch) melts with the base plate 22, and strips the surfaces by squeezing them out in jet actions 27 at the optimum high velocity collision angle 24. Actual joining is accomplished by interatomic linkup of shared valence electrons between two surfaces. Variables that affect the explosive joining process and the collision angle include the thickness of the flyer plate, the material of the flyer plate, the density and malleability of the material of the flyer plate and the type and quantity of the explosive used. The optimum high velocity collision angle 24 maximizes the explosive joining process.

Figure 2:
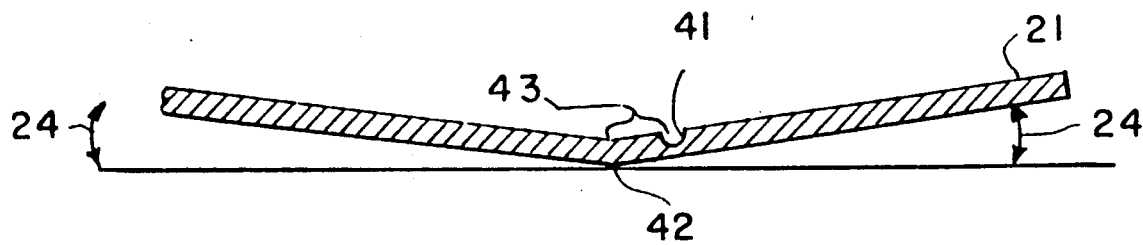
FIG. 2 is a side view of a flyer plate bent to an optimum collision angle and having a machined notch.

In a preferred embodiment, the flyer plate is bent to the optimum high velocity collision angle 24 on both sides as illustrated in FIG. 2. A notch 41 is machined in the flyer plate 21 slightly off-center of the bend line 42, as shown in FIG. 2. The distance 43 from the notch 41 to the bend line 42 is established to provide bonding just beyond the notch. The length of the tab beyond the notch provides a leverage to break the bond at its extremity. As shown in the completed assembly of FIG. 3, a filler material 11 is placed in intimate contact with the flyer plate 21 within the notch 41. The filler material 11 has a density similar to the density of the flyer plate 21 or, preferably, the filler material 11 has physical properties similar to those of the flyer plate 21. The filler material 11 can be the same material as the material of the flyer plate 21. Strands of lead solder wire are especially preferred as filler material for a flyer plate made of tantalum. Special advantages are also obtained when the filler material 11 is pressed into the notch 41 and then bonded into intimate contact with an adhesive means 12, such as Eastman 910 adhesive. Alternatively, the filler material 11 may be heated to its melting point and then poured into notch 41 to form intimate contact with the flyer plate 21.

Figure 3:
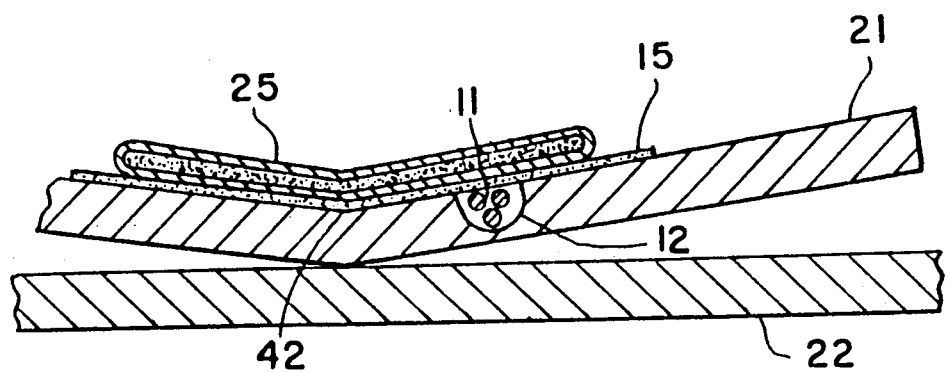
FIG. 3 is a side view of an apparatus in completed assembly prior to detonation with a bent flyer plate.
Figure 4:
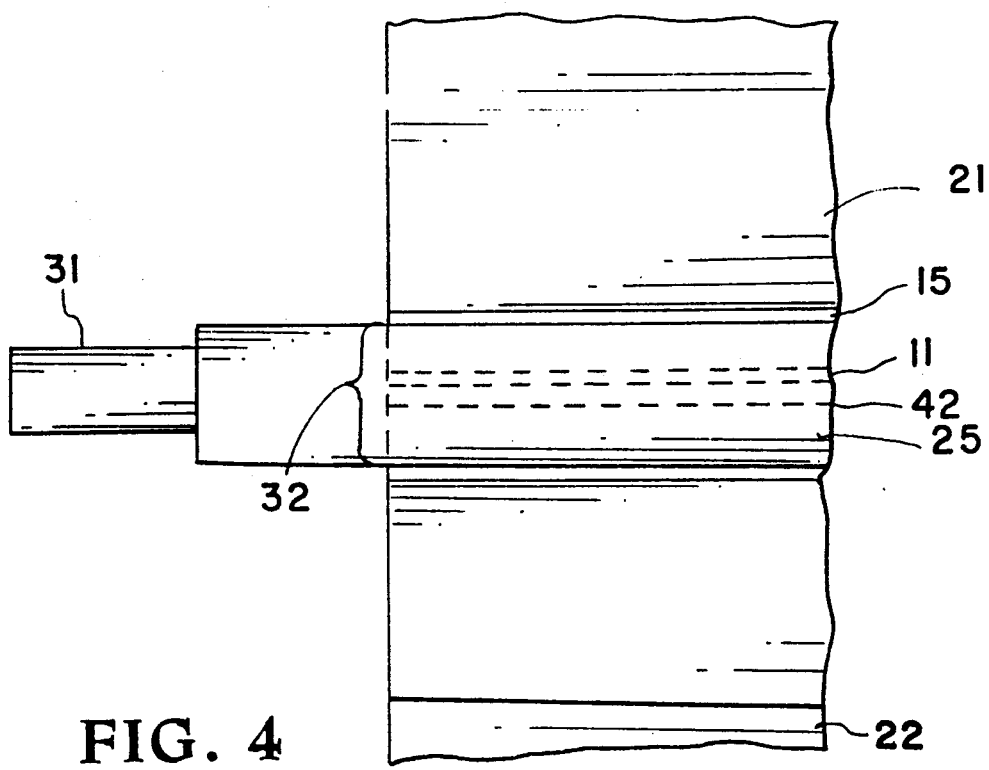
FIG. 4 is a top view of the apparatus of FIG. 3 in completed assembly showing a positioning of a ribbon explosive over the bent flyer plate.

After placement of the filler material 11, an adhesive means 15, such as double back tape, is centered over the bend line 42 as shown in FIG. 3. The adhesive means 15 serves the two purposes of locating the ribbon explosive 25 and providing an energy transfer medium between the ribbon explosive 25 and the flyer plate 21. As shown in FIG. 4, the ribbon explosive 25 is cut to an appropriate length for the desired explosive joint 10 and centered over the bend line 42 and the adhesive means 15. The ribbon explosive 25 is then pressed on the adhesive means 15 to secure a bonded position above the flyer plate 21. A layer of modeling clay and a one-eighth inch sheet of flexible plastic may preferably cover the ribbon explosive 25 to provide partial explosive containment and to protect against lead splatter in an upward direction.

Figure 5:
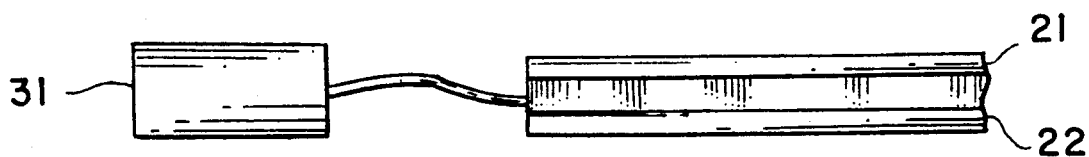
FIG. 5 is a front view of the apparatus of FIG. 3 in completed assembly demonstrating an arrangement of a detonating means with the ribbon explosive.

After bonding the ribbon explosive 25 to the flyer plate 21, a detonating means 31, such as a blasting cap, is mated to the ribbon explosive 25 as demonstrated in FIG. 5. The detonation output area 32 extends simultaneously across the complete cross-section width of the ribbon explosive 25 to attain sufficient pressure to cause the explosion to be self-sustaining. The flyer plate 21 is then positioned over its intended explosive joining area with the base plate 22, with notch 41 being the limit of the joining area. The material of the base plate 22 can be the same as or different from the material of the flyer plate 21. Further, the base plate 22 may have a flat or an uneven surface.

Figure 6:
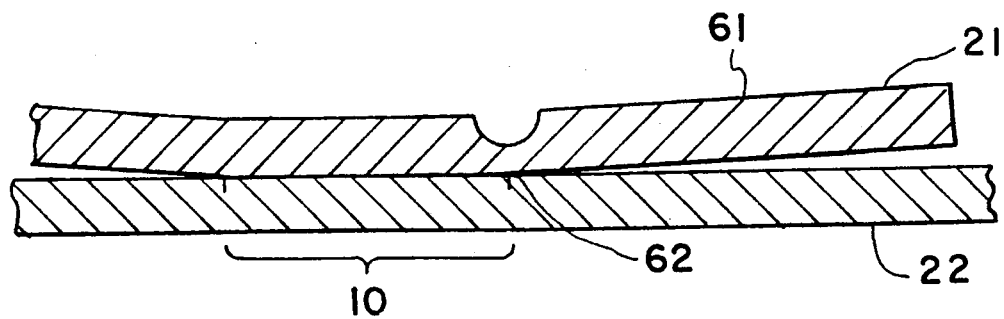
FIG. 6 is a side view of an explosive bond after detonation showing an unbonded tab of a bent flyer plate.
Figure 7:
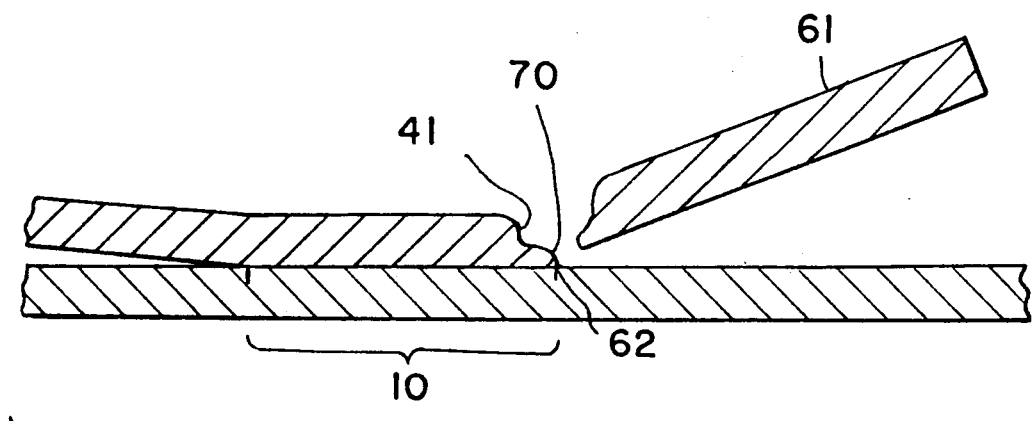
FIG. 7 is a side view of the explosive bond of FIG. 6 with a peeling stress fracturing the unbonded tab of the bent flyer plate.

After positioning the flyer plate 21 over the base plate 22, the detonating means 31 initiates the ribbon explosive 25. The firing of the ribbon explosive 25 drives the flyer plate 21 onto the base plate 22 to accomplish the explosive joint 10 as shown in FIG. 6. The explosive input fractures the adhesive means 12 (if used), holding the filler material 11 and ejects the filler material from notch 41. The embodiment then requires lifting and levering unbonded tab 61 of the flyer plate 21 to apply a peeling stress to the limit 62 of the bonded explosive joint 10. The length of the unbonded tab 61 need only to be of sufficient length to provide adequate leverage. The peeling stress fractures the unbonded tab 61 from the base 70 of the notch 41 to the limit 62 of the bonded explosive joint 10, as demonstrated in FIG. 7. The embodiment results in explosive joint 10 reaching to the extremity of the attached flyer plate. The joint prevents entrapment of contaminants within voids between the plates and allows easy and positive cleaning of newly joined surfaces.

Figure 8:
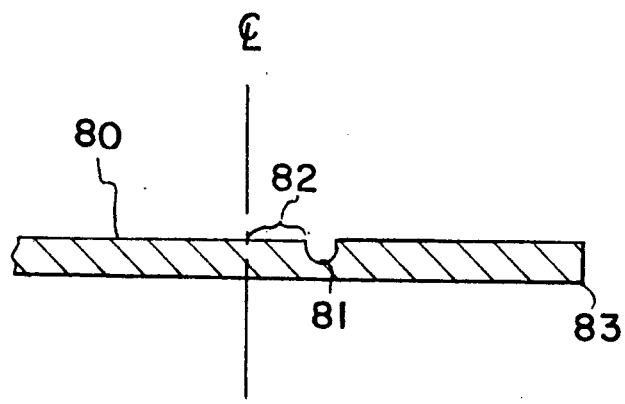
FIG. 8 is a side view of an unbent flyer plate with a machined notch.

In an alternative embodiment, notch 81 is again machined as illustrated in FIG. 8 so that the distance 82 from the notch 81 to the proposed centerline is established to provide bonding just beyond the notch. As appears in FIG. 9, a filler material 91 is again placed in intimate contact with the flyer plate 80 within notch 81. The filler material 91 has a density similar to the density of the flyer plate 80 or, preferably, the filler material 91 has physical properties similar to those of flyer plate 80. The filler material can be the same material as the material of flyer plate 80. Special advantages are obtained when the filler material 91 is pressed into notch 81 and then bonded into intimate contact with an adhesive means 92, such as Eastman 910 adhesive. Alternatively, the filler material 91 may be heated to its melting point and then poured into notch 81 to form an intimate contact with the flyer plate 80.

Figure 9:
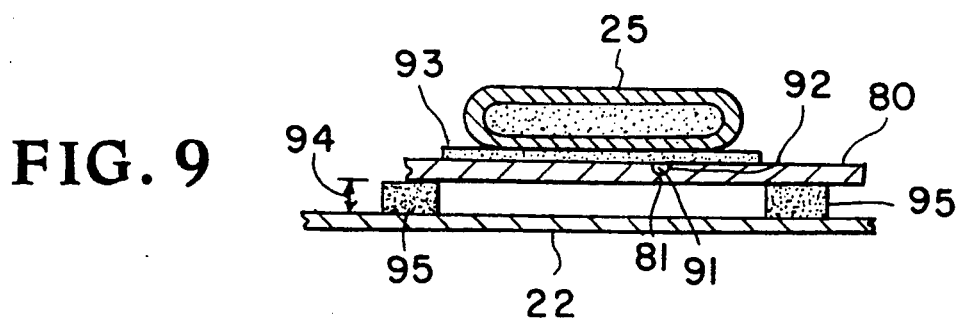
FIG. 9 is a cross-sectional view of an unbent flyer plate and a base plate depicting a standoff means to achieve the necessary separation to set the proper impact angle.

After placement of the filler material 91, an adhesive means 93, such as double back tape, is positioned slightly off-center of notch 81 as shown in FIG. 9. The adhesive means 93 locates the ribbon explosive 25 and provides an energy transfer medium between the ribbon explosive and the flyer plate 80. The ribbon explosive 25 is again cut to an appropriate length for the desired explosive joint 10 and then positioned over adhesive means 93. The ribbon explosive 25 is pressed on the adhesive means 93 to secure a bonded position above flyer plate 80.

After bonding of the ribbon explosive 25, the flyer plate 80 is positioned over its intended explosive joining area with base plate 22, with notch 91 being the limit of the joining area. The material of the base plate 22 can be the same as or different from the material of flyer plate 80. Further, the base plate 22 may have a flat surface or an uneven one. A plate standoff 94 or separation is required to achieve in this embodiment the high velocity, angular collision necessary to effect the explosive joint 10. A standoff means 95, such as masking tape, accomplishes this necessary standoff 94. Minimum standoff, approximately 0.010 inch, achieves the required velocity to effect an explosive joint. Maximum standoff, approximately 0.025 inch, causes the most material deformation and bending energy losses.

Figure 10:
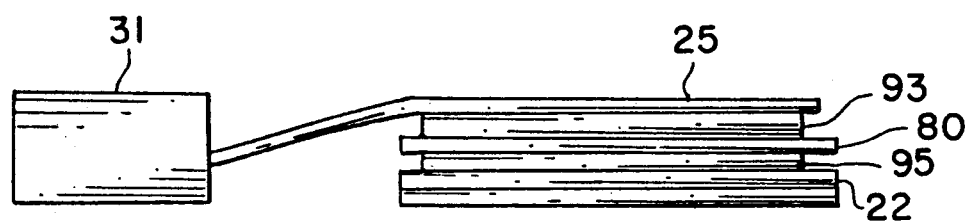
FIG. 10 is a front view of an apparatus with an unbent flyer plate in completed assembly demonstrating an arrangement of a detonating means with the ribbon explosive.
Figure 11:
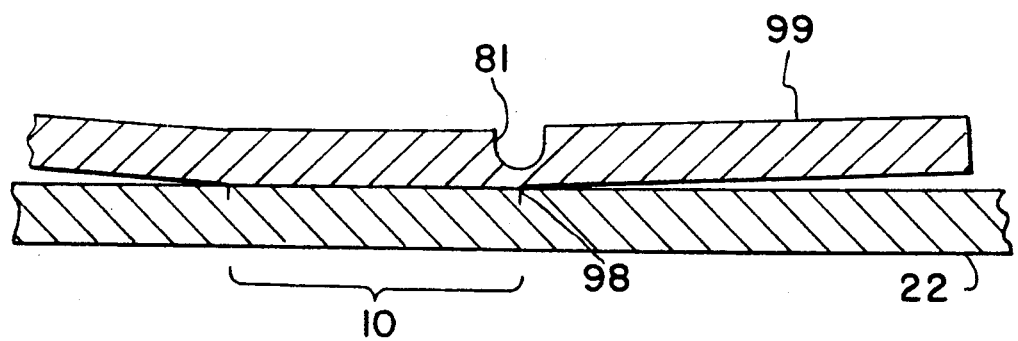
FIG. 11 is a side view of an explosive bond after detonation showing an unbonded tab of an unbent flyer plate.
Figure 12:
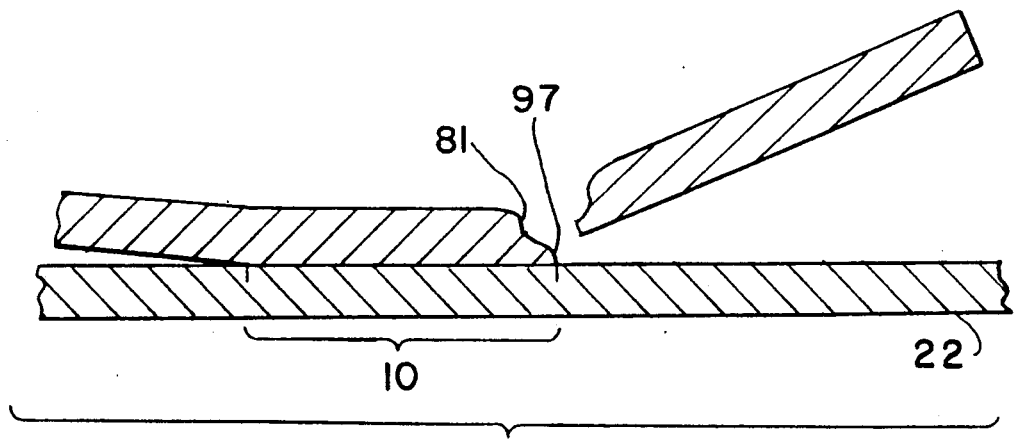
FIG. 12 is a side view of the explosive bond of FIG. 11 with a peeling stress fracturing the unbonded tab of the unbent flyer plate.

After positioning the flyer plate 80 over the base plate 22, a detonating means 31, such as a blasting cap, is mated to the ribbon explosive 25 as shown in FIG. 10. The detonation area extends simultaneously across the complete cross-section width of the ribbon explosive 25 to attain sufficient pressure to cause the explosion to be self-sustaining. The detonating means 31 initiates the ribbon explosive 25, and the firing of the explosive 25 drives flyer plate 80 onto base plate 22 to accomplish the explosive joint 10 as demonstrated in FIG. 11. The explosive input again fractures the adhesive means 12 (if used) holding filler material 91 and ejects the filler material 91 from notch 81. This embodiment, like the prior one, then requires lifting and levering unbonded tab 99 of the flyer plate 80 to apply a peeling stress to the limit 98 of the bonded explosive joint 10. The peeling stress fractures the unbonded tab 99 from the base 97 of the notch 81 to the limit 98 of the bonded explosive joint 10, as shown in FIG. 12. This embodiment results in an explosive joint 10 reaching to the extremity of the attached flyer plate.

While specific embodiments of the invention have been described herein, they are only exemplary of the novel features of the invention and are not exhaustive. Many variations and modifications of these specific examples will be readily apparent to those skilled in the art in light of the above teachings without departing from the scope of the appended claims. This invention may be practiced otherwise than as specifically described herein.

What is new and desired to be secured by Letters Patent of the United States is:

1. An apparatus for miniature explosive joining of a metallic surface to a base plate, comprising:
   (a) a flyer plate bent to an optimum collision angle forming a bond line;
   (b) a ribbon explosive centered over the bend line of the flyer plate;
   (c) a detonating means for initiating the ribbon explosive;
   (d) an adhesive means for holding the ribbon explosive to the flyer plate;
   (e) the flyer plate having a notch containing a filler material;
   (f) the filler material having a density similar to the density of the flyer plate; and
   (g) the filler material being in intimate contact with the flyer plate.

2. An apparatus for miniature explosive joining of a metallic surface to a base plate as in claim 1, wherein the ribbon explosive is a high energy, low-yield, sheathed miniature explosive.

3. An apparatus for miniature explosive joining of a metallic surface to a base plate as in claim 1, wherein the ribbon explosive is a miniature ribbon of miniature lead-sheather cyclotrimethylene-trinitramine.

4. An apparatus for miniature explosive joining of a metallic surface to a base plate as in claim 1, wherein the ribbon explosive is a secondary explosive.

5. An apparatus for miniature explosive joining of a metallic surface to a base plate as in claim 1, further comprising a second adhesive means holding the filler material in intimate contact within the notch of the flyer plate.

6. An apparatus for miniature explosive joining of a metallic surface to a base plate as in claim 1, wherein the base plate and the flyer plate are made of the same material.

7. An apparatus for miniature explosive joining of a metallic surface to a base plate as in claim 1, wherein the base plate and the flyer plate are made of different materials.

8. An apparatus for miniature explosive joining of a metallic surface to a base plate as in claim 1, wherein the base plate has a flat surface.

9. An apparatus for miniature explosive joining of metallic surface to a base plate in claim 1, wherein the base plate has an uneven surface.

10. An apparatus for miniature explosive joining of a metallic surface to a base plate as in claim 1, wherein the filler material has physical properties similar to those of the flyer plate.

11. A process for miniature explosive joining of a metallic surface to a base plate which minimizes the quantity of explosives used and reduces damaging pressure waves and noise, comprising:
   (a) bending a flyer plate to an optimum collision angle;
   (b) notching the flyer plate;
   (c) placing a filler material having a density similar to the density of the flyer plate in intimate contact within the notch of the flyer plate;
   (d) centering an adhesive means and a ribbon explosive in position over the bend line of the flyer plate;
   (e) bonding the ribbon explosive in its centered position to the flyer plate with the adhesive means;
   (f) mating the ribbon explosive to a detonating means so that a detonation area extends across the complete width of the ribbon explosive;
   (g) positioning the flyer plate over its intended joining area with the base plate;
   (h) initiating the ribbon explosive with the detonating means to effect a bonded explosive joint;
   (i) lifting and levering an unbonded tab of the flyer plate to apply a peeling stress to a limit of the bonded explosive joint; and
   (j) removing the unbonded tab after the peeling stress fractures the unbonded tab at a base of the notch.

12. A process for miniature explosive joining of a metallic surface to a base plate as in claim 11, wherein the ribbon explosive is a high energy, low-yield, sheathed miniature explosive.

13. A process for miniature explosive joining of a metallic surface to a base plate as in claim 11, wherein the ribbon explosive is a miniature ribbon of miniature lead-sheathed cyclotrimethylene-trinitramine.

14. A process for miniature explosive joining of a metallic surface to a base plate in claim 11, wherein the ribbon explosive is a secondary explosive.

15. A process for miniature explosive joining of a metallic surface to a base plate as in claim 11, further comprising bonding the filler material into the notch with a second adhesive means to provide intimate contact.

16. A process for miniature explosive joining of a metallic surface to a base plate as in claim 11, wherein the base plate and the flyer plate are made of the same material.

17. A process for miniature explosive joining of a metallic surface to a base plate as in claim 11, wherein the base plate and the flyer plate are made of different materials.

18. A process for miniature explosive joining of a metallic surface to a base plate as in claim 11, wherein the base plate has a flat surface.

19. A process for miniature explosive joining of a metallic surface to a base plate as in claim 11, wherein the base plate has an uneven surface.

20. A process for miniature explosive joining of a metallic surface to a base plate as in claim 11, wherein the filler material has physical properties similar to those of the flyer plate.

21. An apparatus for miniature explosive joining of two metallic surfaces comprising:
   (a) a flyer plate for explosive joining to a base plate;
   (b) a ribbon explosive bonded to the flyer plate;
   (c) a detonating means for initiating the ribbon explosive;
   (d) an adhesive means for bonding the ribbon explosive to the flyer plate;
   (e) a standoff means separating the flyer plate from the base plate;
   (f) the flyer plate having a notch containing a filler material;
   (g) the filler material having a density similar to the density of the flyer plate; and
   (h) the filler material being in intimate contact with the flyer plate.

22. An apparatus for miniature explosive joining of two metallic surfaces as in claim 21, wherein the ribbon explosive is a high-energy, low-yield, sheathed miniature explosive.

23. An apparatus for miniature explosive joining of two metallic surfaces as in claim 21, wherein the ribbon explosive is a miniature ribbon of miniature lead-sheathed cyclotrimethylene-trinitramine.

24. An apparatus for miniature explosive joining of two metallic surfaces as in claim 21, wherein the ribbon explosive is a secondary explosive.

25. An apparatus for miniature explosive joining of two metallic surfaces as in claim 21, further comprising a second adhesive means for bonding the filler material in intimate contact within the notch of the flyer plate.

26. An apparatus for miniature explosive joining of two metallic surfaces as in claim 21, wherein the base plate and the flyer plate are made of the same material.

27. An apparatus for miniature explosive joining of two metallic surfaces as in claim 21, wherein the base plate and the flyer plate are made of different materials.

28. An apparatus for miniature explosive joining of two metallic surfaces as in claim 21, wherein the base plate and the flyer plate have flat, parallel surfaces.

29. An apparatus for miniature explosive joining of two metallic surfaces as in claim 21, wherein the base plate has an uneven surface.

30. An apparatus for miniature explosive joining of two metallic surfaces as in claim 21, wherein the filler material has physical properties similar to those of the flyer plate.

31. A process for miniature explosive joining of two metallic surfaces which minimizes the quantity of explosives used and reduces damaging pressure waves and noise, comprising:
   (a) notching a flyer plate;
   (b) placing a filler material having a density similar to the density of the flyer plate in intimate contact within the notch of the flyer plate;
   (c) bonding a ribbon explosive to the middle of the flyer plate with an adhesive means;
   (d) mating the ribbon explosive to a detonating means so that a detonation area extends across the complete width of the ribbon explosive;
   (e) providing a standoff means between the flyer plate and a base plate in the area for the intended explosive joining;
   (f) positioning the flyer plate over its intended joining area with the base plate;
   (g) initiating the ribbon explosive with the detonating means to effect an explosive joining;
   (h) lifting and levering an unbonded tab of the flyer plate to apply a peeling stress to a limit of the bonded area; and
   (i) removing the unbonded tab after the peeling stress fractures the unbonded tab free.

32. A process for miniature explosive joining of two metallic surfaces as in claim 31, wherein the ribbon explosive is a high-energy, low-yield, sheathed miniature explosive.

33. A process for miniature explosive joining of two metallic surfaces as in claim 31, wherein the ribbon explosive is a miniature ribbon of miniature lead-sheathed cyclotrimethylene-trinitramine.

34. A process for miniature explosive joining of two metallic surfaces as in claim 31, wherein the ribbon explosive is a secondary explosive.

35. A process for miniature explosive joining of two metallic surfaces as in claim 31, further comprising bonding the filler material into the notch with a second adhesive means to provide intimate contact.

36. A process for miniature explosive joining of two metallic surfaces as in claim 31, wherein the base plate and the flyer plate are made of the same material.

37. A process for miniature explosive joining of two metallic surfaces as in claim 31, wherein the base plate and the flyer plate are made of different materials.

38. A process for miniature explosive joining of two metallic surfaces as in claim 31, wherein the base plate and the flyer plate have flat, parallel surfaces.

39. A process for miniature explosive joining of two metallic surfaces as in claim 31, wherein the base plate has an uneven surface.

40. A process for miniature explosive joining of two metallic surfaces as in claim 31, wherein the filler material has physical properties similar to those of the flyer plate.

* * * * *